UNITED STATES PATENT OFFICE.

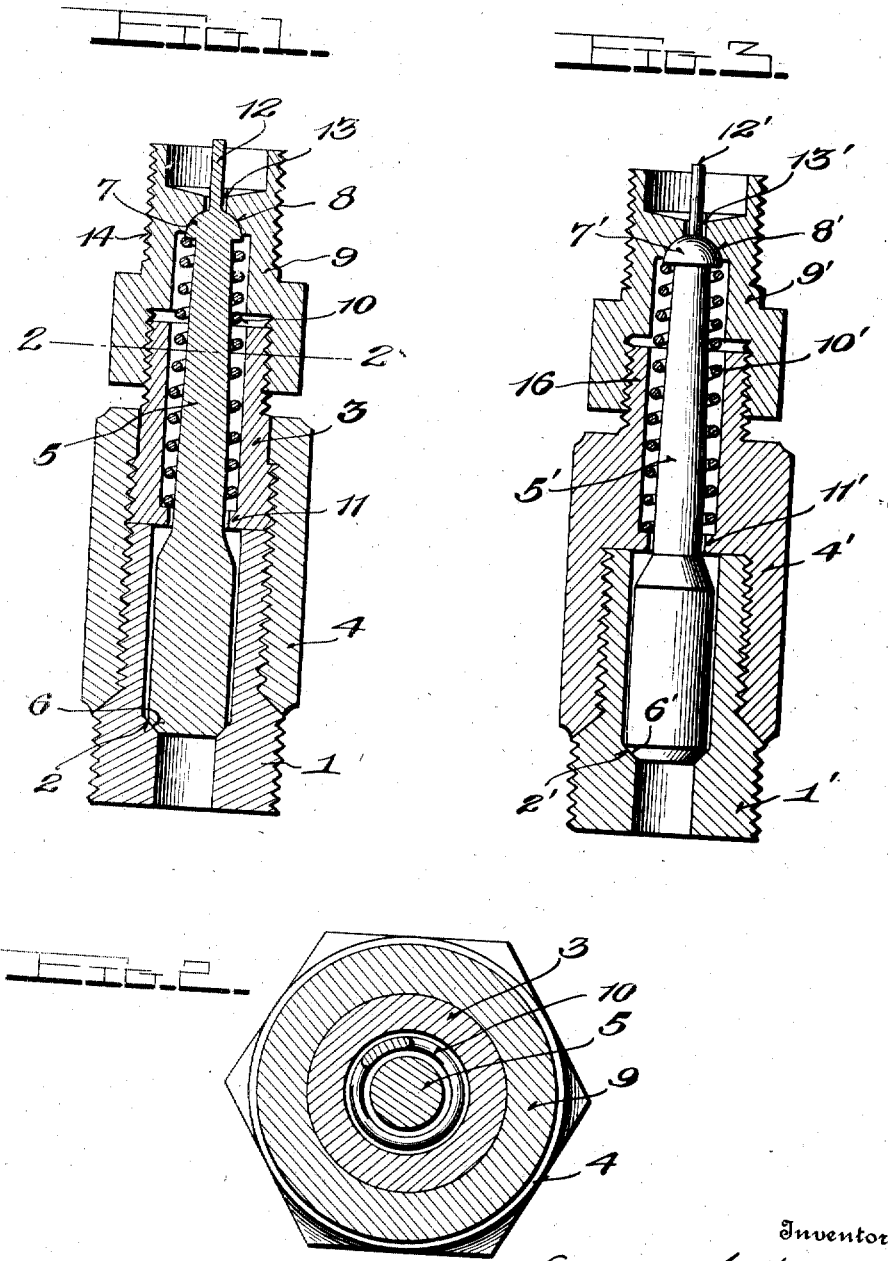

WILLIAM C. HUNTOON, OF PROVIDENCE, RHODE ISLAND.

PNEUMATIC-TIRE VALVE.

1,275,033.    Specification of Letters Patent.    Patented Aug. 6, 1918.

Application filed February 13, 1918. Serial No. 217,011.

*To all whom it may concern:*

Be it known that I, WILLIAM C. HUNTOON, a citizen of the United States, residing at Providence, in the county of Providence and State of Rhode Island, have invented a new and useful Improvement in Pneumatic-Tire Valves, of which the following is a specification.

This invention relates to certain new and useful improvements in pneumatic tire valves, and the primary object thereof is to provide a valve which forms a novel positive lock against the escape of air.

Further, the invention aims to provide a device which can be simply screwed into the present valve stems of tire valves, and which affords a double lock for the air by providing two metal to metal joints.

Still further, the invention aims to provide a device of this character in which the tire may be inflated by simply turning one of the parts and in which the back pressure from within the tire will hold the valve stem seated so as to prevent escape of the air, the incoming air from the pump being required to merely overcome the pressure of a light spring to permit of inflation of the tire.

In the drawings—

Figure 1 is a vertical sectional view of the invention.

Fig. 2 is an enlarged section on line 2—2 of Fig. 1.

Fig. 3 is a view similar to Fig 1 of a modified form of the invention.

In proceeding in accordance with the present invention, a sleeve 1 is employed having a valve seat 2 on its interior and being engaged at its top by a second sleeve 3, the latter being exteriorly threaded at each of its ends and being held in rigid relation to the sleeve 1, by means of a coupling member or nut 4, the latter being threaded over the sleeve 1.

A valve stem 5 is formed with a lower valve 6 which engages against the seat 2 and passes through the sleeve 3, and at its upper end is formed with a second valve 7, a guiding pin 12 extending upwardly from the valve 7 as depicted in the drawings. The valve 7 engages against or on a valve seat 8 formed interiorly of a nut 9, the latter threading over the upper threads of the sleeve 3. A spring 10 surrounds the valve stem 5 and at its upper end abuts the under face of the valve 7, and at its lower end seats on an inwardly extending flange 11 formed on the lower end of the sleeve 3.

The guiding pin 12 extends through an opening 13 formed in the nut 9, the latter being exteriorly threaded at 14 to receive the usual cap for closing the valve against the ingress of dirt, while the sleeve 1, is suitably threaded to engage within or with the usual threads of a valve stem of common form and usage.

In operation, the parts are normally in the position shown in the drawings, in which the valves 6 and 7 are engaged with their outwardly and inwardly facing seats 2 and 8 respectively, and are rigidly held in such positions by screwing the nut 9 down to its limit of movement, which causes seat 8 of the nut to engage the upper valve 7 and to force the stem with the latter downwardly to effect firm seating of the valve 6 on its seat 2. When it is desired to inflate the tire, the nut 9 is turned to move outwardly or away from sleeve 3, which action causes spring 10 to move the stem 5 outwardly, thus moving valve 6 up from its outwardly facing seat 2, but at the same time the valve 7 will be held by the spring against seat 8 due to the latter facing inwardly, and will be positively held by the back pressure within the tire. The air from the pump is thus required to merely overcome the action of the light spring 10, and the back pressure in the tire in order to unseat valve 7 from its seat 8 and to then pass through sleeves 1 and 3 and enter the tire.

The invention thus provides a double metal to metal lock against the escape of air when the parts are closed after inflation, and during the latter provides a single lock for preventing the air from escaping.

The modification is similar in all material respects to the preferred form, similar parts being identified by the same reference characters except that in the modification the characters are primed, and instead of employing a separate sleeve 3, the member 4' is formed with an integral sleeve or collar-like extension 16, the latter threaded to receive the nut 9'.

Having thus described my invention, what I claim as new and desire to secure by Letters Patent is—

1. In a tire valve, a sleeve formed for attachment to the valve stem of an ordinary tire valve and having a valve seat on its interior, a member secured to the sleeve and having a bore and an inwardly extending flange extending partly across the interior of the sleeve, a stem having a valve engageable with said valve seat and with said flange so as to be confined in its movements thereby, a second valve on the last named stem, a coil spring surrounding the last named stem and engaged with said second valve and with said flange, and a nut on said member having a seat for said second valve.

2. In a tire valve, a sleeve formed for attachment to the valve stem of an ordinary tire valve and having a valve seat on its interior, a member secured to the sleeve and having a bore, a spring tensioned stem having a valve engageable with said seat, means to restrict outward movement of said last named stem, a second valve on the last named stem, and a nut on said member operating independent of said restricting means and having a seat for said second valve.

In testimony whereof I have hereunto set my hand this 7th day of February, 1918.

WILLIAM C. HUNTOON.

In presence of—
ADA E. HAGERTY,
J. A. MILLER.